(12) United States Patent
Kanekawa et al.

(10) Patent No.: US 7,969,229 B2
(45) Date of Patent: Jun. 28, 2011

(54) ON-CHIP REDUNDANCY HIGH-RELIABLE SYSTEM AND METHOD OF CONTROLLING THE SAME

(75) Inventors: Nobuyasu Kanekawa, Hitachi (JP); Ryoichi Kobayashi, Tokai (JP); Tomonobu Koseki, Hitachinaka (JP); Katsuya Oyama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 15 days.

(21) Appl. No.: 12/389,194

(22) Filed: Feb. 19, 2009

(65) Prior Publication Data

US 2010/0207681 A1    Aug. 19, 2010

(51) Int. Cl.
*G06F 11/16* (2006.01)
(52) U.S. Cl. ..................................................... 327/526
(58) Field of Classification Search .................. 327/403, 327/407, 526
See application file for complete search history.

(56) References Cited

U.S. PATENT DOCUMENTS

| | | | |
|---|---|---|---|
| 5,638,510 A | 6/1997 | Ishikawa | |
| 6,513,131 B1 | 1/2003 | Kanekawa et al. | |
| 7,237,144 B2 * | 6/2007 | Safford et al. | 714/11 |
| 7,392,426 B2 * | 6/2008 | Wolfe et al. | 714/11 |

FOREIGN PATENT DOCUMENTS

| | | |
|---|---|---|
| EP | 0 840 225 B1 | 1/2003 |
| JP | 6-35880 A | 2/1994 |
| JP | 6-149604 A | 5/1994 |
| JP | 6-161798 A | 6/1994 |
| JP | 7-234801 A | 9/1995 |
| JP | 10-261762 A | 9/1998 |
| JP | 2005-315840 A | 11/2005 |
| JP | 2006-51922 A | 2/2006 |
| JP | 2007-263943 A | 10/2007 |

OTHER PUBLICATIONS

Japanese Office Action with partial English translation dated Jan. 18, 2011 (nine (9) pages).

* cited by examiner

*Primary Examiner* — Jeffrey S Zweizig (74) *Attorney, Agent, or Firm* — Crowell & Moring LLP (57) ABSTRACT

A comparator circuit for comparing outputs of an on-chip redundant system is mounted on a second semiconductor chip that is separate from the on-chip redundant system. The second semiconductor chip which preferably contains a power source circuit for supplying power to the on-chip redundant system, a driver circuit for driving an output circuit, and the like are mounted. With this configuration, the influence of a failure occurring in the on-chip redundancy system can be prevented from being exerted on the comparator measure.

22 Claims, 9 Drawing Sheets

ON-CHIP REDUNDANCY HIGH-RELIABLE SYSTEM AND METHOD OF CONTROLLING THE SAME

BACKGROUND OF THE INVENTION

1. Field of the Invention

The present invention relates to a semiconductor redundancy system having high reliability and, more particularly, to an on-chip redundancy high-reliable system using function blocks such as microprocessors or hard logic circuits provided redundantly in semiconductor chips.

2. Description of the Related Art

In the technical fields requiring systems such as aerospace systems, railroad systems, and vehicles of high safety, conventionally, higher reliability of a system is widely achieved by redundantly disposing a spare system as a backup. In particular, the integration degree of a semiconductor in a semiconductor integrated circuit is increasing in recent years. A function block circuit of a system level can be mounted on a semiconductor chip by a system on-chip method. For example, as disclosed in Japanese Unexamined Patent Application Publication No. H06-161798, a system redundantly provided with a plurality of function blocks can be realized in a single semiconductor chip. A method of constructing a redundant system in a semiconductor chip is an extremely excellent technique realizing reduction in size and weight of a built-in system, shortening signal delay time in a high-performance system, and improvement in performance.

In the conventional techniques, a physical damage such as breaking or crack occurs in a semiconductor chip by a heat cycle applied to the semiconductor chip under severe heat environment of, for example, −40 degrees Celsius to 150 degrees. It is therefore indispensable to consider a countermeasure for a failure exerting influence on an entire semiconductor chip. In a conventional method of assuring a normal state by comparing outputs of systems redundantly provided, since a comparator measure for detecting a failure is mounted in the semiconductor chip in which the redundant systems are also provided, the operation in the case where the influence of a failure is exerted on the comparator measure cannot be assured. In the case where a processor module and a comparator are formed in different chips like in the patent publication, the conventional technique cannot achieve high-speed process which is presently being demanded.

An object of the present invention is to improve reliability of an on-chip redundancy system mounted on a semiconductor chip by preventing influence of a failure from being exerted on an entire semiconductor chip.

SUMMARY OF THE INVENTION

To achieve the object, according to the present invention, a comparator measure for comparing outputs of an on-chip redundancy system is mounted on another semiconductor chip different from the on-chip redundancy system. In this case, existing peripheral circuits indispensable to the redundancy system and the comparator measure are mounted on the same chip. The existing peripheral circuits are a power source circuit, a driver circuit for driving various output circuits, and the like. Many of the peripheral circuits are originally provided on another chip for the system. Without increasing the number of new chips, the influence of a failure to the comparator measure is prevented.

In the case where a failure is detected by the comparator measure, power supply to the redundancy system is stopped, or a reset signal or an NMI (non-maskable interrupt) signal is transmitted to the redundancy system, thereby stopping the operation of the redundancy system and assuring safety.

According to the present invention, by constructing the redundancy system and the comparator measure on different chips, the influence of a failure exerted on the entire semiconductor chip is prevented, and reliability of the on-chip redundancy system can be increased. By mounting a comparator measure in a second semiconductor chip having existing peripheral circuits in the system, without increasing the number of chips, the reliability of the on-chip redundancy system can be increased.

DETAILED DESCRIPTION OF PREFERRED EMBODIMENTS OF THE INVENTION

Embodiments of the present invention will be described below with reference to the drawings. The present invention, however, is not limited to the embodiments.

First Embodiment

Figure 1:
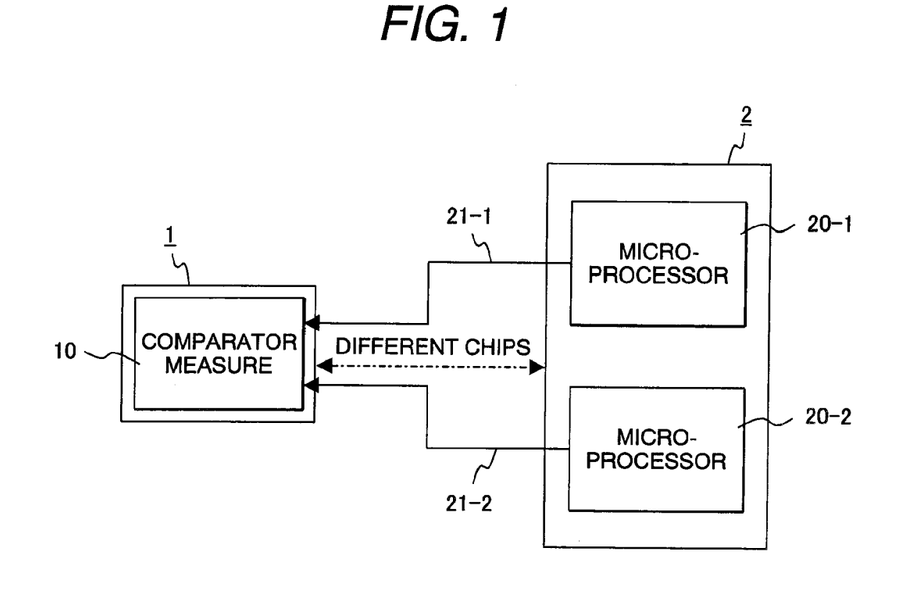
FIG. 1 is a block diagram showing a first embodiment of the present invention.

Embodiments of the present invention will be described below with reference to the drawings. FIG. 1 is a block diagram showing a first embodiment of the present invention.

Microprocessors 20-1 and 20-2 redundantly provided as function blocks are mounted in a first semiconductor chip 2. A comparator measure 10 for comparing outputs 21-1 and 21-2 of the microprocessors 20-1 and 20-2 is mounted in a second semiconductor chip 1 different from the semiconductor chip 2. As functional blocks, in place of the microprocessors in FIG. 1, hard logic circuits such as an FFT (Fast Fourier Transform) circuit and a digital filter can be also mounted.

Second Embodiment

Figure 2:
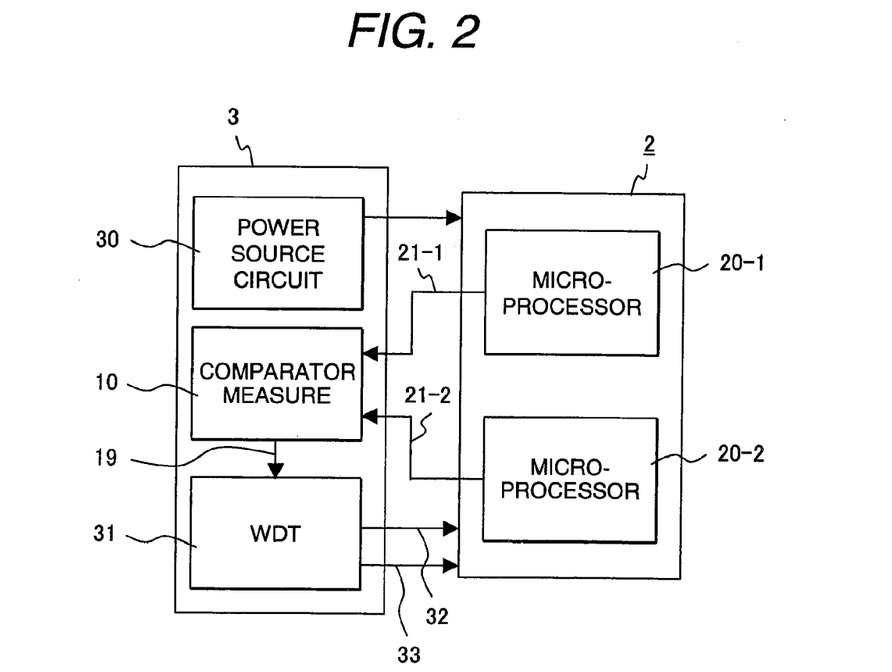
FIG. 2 is a block diagram showing a second embodiment in which a comparator measure and a power source circuit are mounted on the same semiconductor chip.

FIG. 2 shows a second embodiment in which the comparator measure 10 is mounted in a power source circuit semiconductor chip 3 having a power source circuit 30 and a watch dog timer 31 (WDT) provided as output control means. The watch dog timer 31 has output control means. In the case where a survival notification does not arrive from at least one of the microprocessors 20-1 and 20-2 for predetermined time or longer, the watch dog timer 31 regards it as a failure in the microprocessor 20-1 or 20-2 and outputs a reset signal 32 to stop the operation of the microprocessors 20-1 and 20-2. Alternatively, the watch dog timer 31 outputs an NMI (Non-Maskable Interrupt) signal 33 to start a failure handling routine, makes the microprocessor recover from a recoverable point, and maintains the system and an object to be controlled in a safe state.

In the embodiment, the comparator measure 10 also has the function of output control means. The comparator measure 10 compares outputs 21-1 and 21-2 of the microprocessors 20-1 and 20-2 and, in the case where a comparison result 19 indicates a failure, similarly outputs the reset signal 32 or the NMI (Non-Maskable Interrupt) signal 33 to stop the operation of the microprocessors 20-1 and 20-2, or makes the microprocessors recover, and maintains the system and an object to be controlled in a safe state.

Third Embodiment

Figure 3:
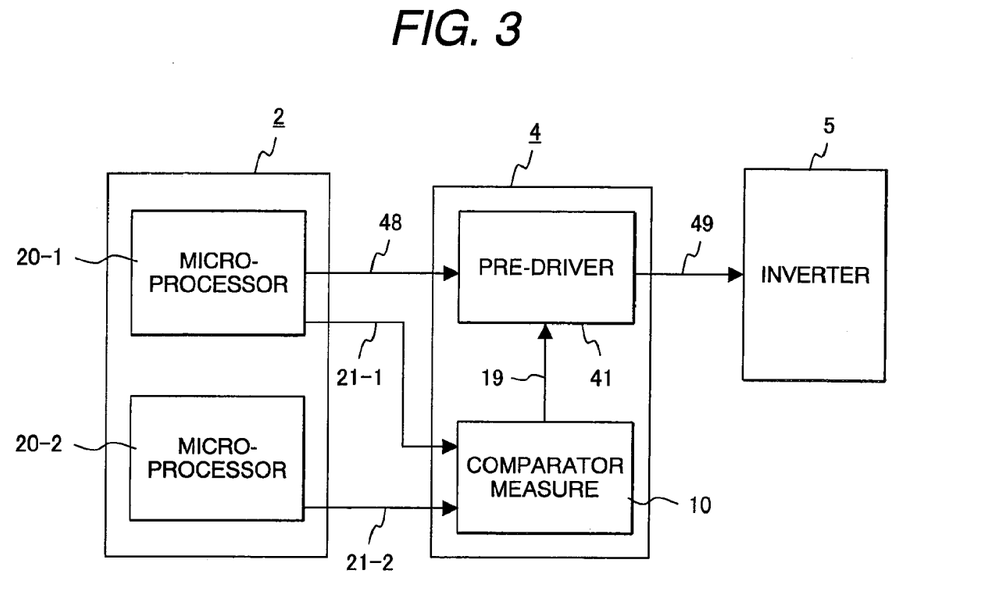
FIG. 3 is a block diagram showing a third embodiment in which a comparator measure and a driver circuit are mounted on the same semiconductor chip.

FIG. 3 shows a third embodiment in which the comparator measure 10 is mounted on a driver circuit semiconductor chip 4 having a pre-driver 41 as a driver circuit. The comparator measure 10 compares the outputs 21-1 and 21-2 of the microprocessors 20-1 and 20-2. In the case where the comparison result 19 indicates a failure, the comparator measure 10 stops the operation of the pre-driver 41 and maintains the system and an object to be controlled in a safe state. Reference numeral 49 denotes an output of the pre-driver 41, and reference numeral 5 indicates an inverter as an object to be controlled.

Fourth Embodiment

Figure 4:
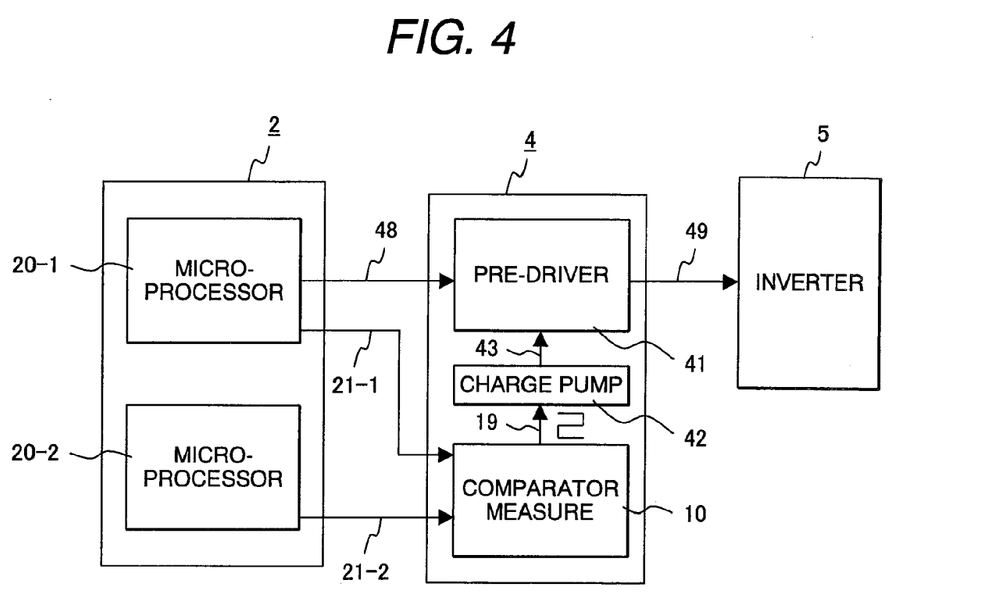
FIG. 4 is a block diagram showing a fourth embodiment of driving a charge pump by an output of the comparator measure.

FIG. 4 shows a fourth embodiment in which the driver circuit semiconductor chip 4 on which the comparator measure 10 is mounted further includes a charge pump 42 as a booster circuit. The comparator measure 10 compares the outputs 21-1 and 21-2 of the microprocessors 20-1 and 20-2. In the case where the comparison result 19 indicates a failure, the comparator measure 10 stops the operation of the charge pump 42 to thereby stop the operation of the pre-driver 41, and maintains the system and an object to be controlled in a safe state.

As shown in FIG. 4, an alternating signal is used as the comparison result 19 from the comparator measure 10. By driving the charge pump 42 by the alternating signal, even in the case where an output fix failure (a failure in which output is fixed to L or H) of the comparison result 19 occurs, the operation of the charge pump 42 can be securely stopped and the operation of the driver IC 4 can be stopped.

By making the outputs 21-1 and 21-2 of the microprocessors 20-1 and 20-2 match and mismatch every predetermined cycles, the comparison result 19 from the comparator measure 10 repeats the values of H and L every predetermined cycles which become alternating signals. In this case, when the outputs 21-1 and 21-2 of the microprocessors 20-1 and 20-2 match, the comparison result 19 from the comparator measure 10 is set as an H output. When the outputs 21-1 and 21-2 do not match, the comparison result 19 is set as an L output.

The charge pump 42 converts direct current to alternate current by switching operation, rectifies the alternate current, and performs operation of converting the current to direct current having a higher voltage. In the embodiment, the switching operation is performed on the basis of the comparison result 19. Consequently, in the case where an output fix failure of the comparison result 19 from the comparator measure 10 occurs, the comparison result 19 is fixed to H or L, and the operation of the charge pump 42 stops. As a result, supply of the high-voltage power supply power is stopped to securely stop the operation of the pre-driver 41. The system and an object to be controlled can be maintained in a safe state.

Fifth Embodiment

Figure 5:
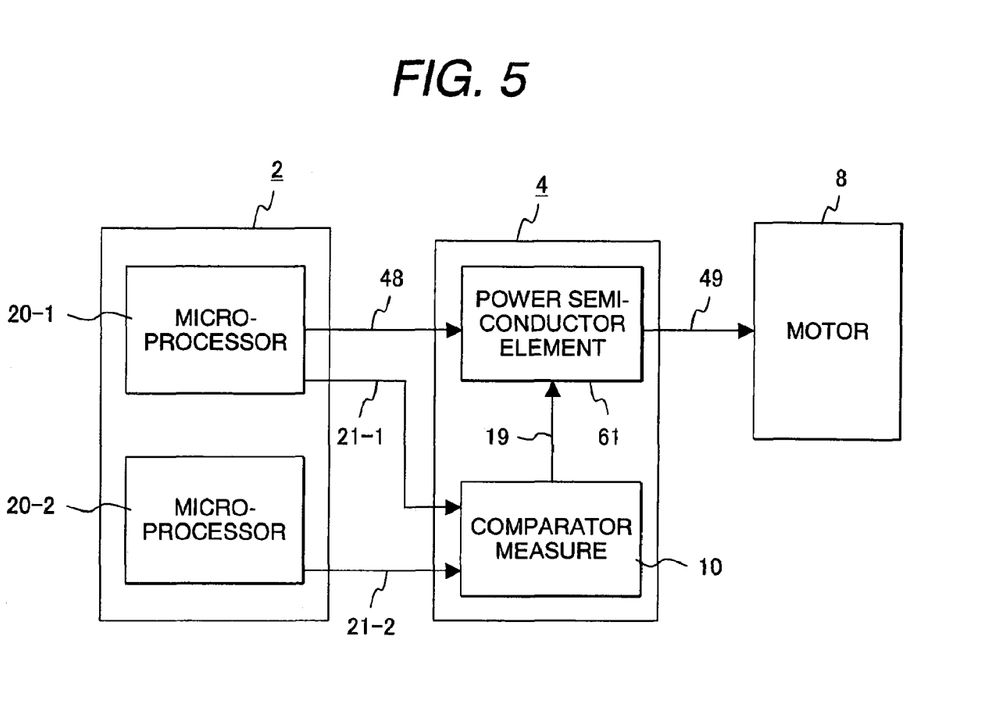
FIG. 5 is a block diagram showing a fifth embodiment in which the comparator measure and a power semiconductor are mounted on the same chip.

FIG. 5 shows a fifth embodiment in which the comparator measure 10 is provided for a power semiconductor element semiconductor chip 6 including a power semiconductor element 61 for driving a load and an actuator. In this case as well, the comparator measure 10 functions as output control means, compares the outputs 21-1 and 21-2 of the microprocessor 20-1 and 20-2, in the case where the comparison result 19 indicates a failure, stops operation of the power semiconductor element 61, and maintains the system and an object to be controlled in a safe state.

Further, the power semiconductor element 61 can prevent itself from being destroyed by erroneous operation of the microprocessors 20-1 and 20-2. The actuator driven by the power semiconductor element 61 may be a motor 8, a solenoid, a main power relay for supply power to an output stage, or an output relay for intermittently supplying drive current from the output circuit to the actuator (or a phase current relay in motor control).

Figure 6:
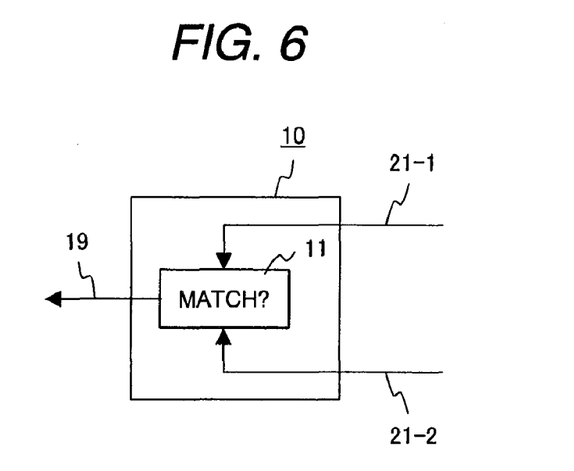
FIG. 6 is a block diagram showing a first pattern of the comparator measure.

FIGS. 6 to 9 show, as modifications, various patterns of the comparator measure 10. FIG. 6 shows, as a modification, a first pattern of the comparator measure for comparing the outputs 21-1 and 21-2 of the microprocessors 20-1 and 20-2 by a comparator 11. The modification is preferable for the reason that the same process is executed in the microprocessors 20-1 and 20-2 and results of the process are compared with each other, thereby assuring a normal state. The comparator 11 is, desirably, a self-checking-type comparator capable of detecting a failure of the comparator itself.

Figure 7:
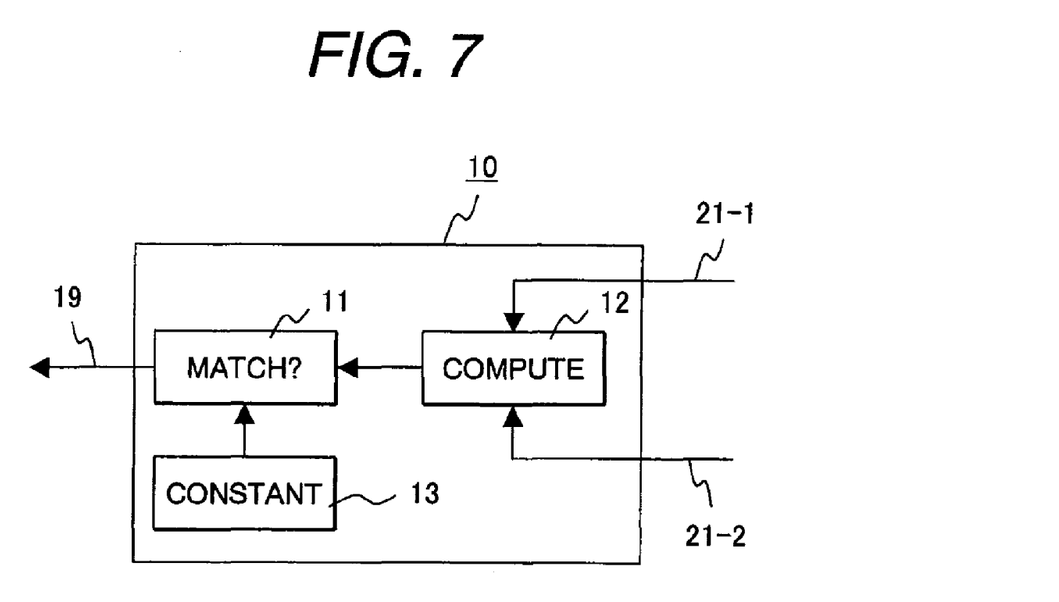
FIG. 7 is a block diagram showing a second pattern of the comparator measure.

FIG. 7 shows a second pattern of computing the outputs 21-1 and 21-2 of the microprocessors 20-1 and 20-2 by a computing unit 12 and comparing the result of the computation with a constant 13 by the comparator 11. The computing unit 12 may computes four arithmetic operations of addition, subtraction, multiplication, and division, exclusive OR, or the like. The modification is suitable for the reason that the microprocessors 20-1 and 20-2 give each other questions for obtaining a variable which becomes a constant when a predetermined operation is performed on a given value. When the result is correct, the normal state is assured.

Figure 8:
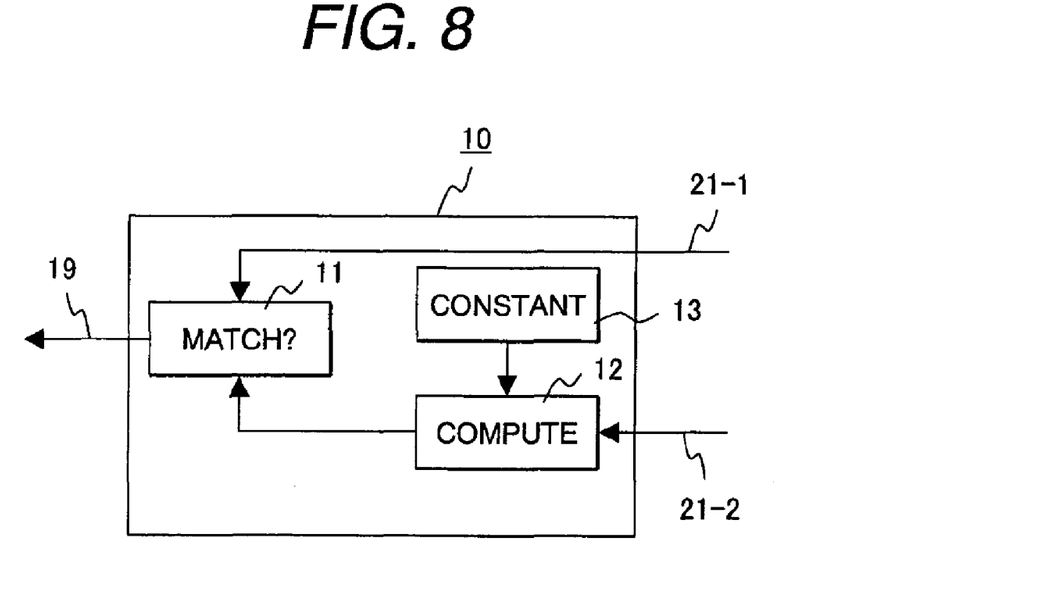
FIG. 8 is a block diagram showing a third pattern of the comparator measure.

FIG. 8 shows a third pattern of computing one of the outputs 21-1 and 21-2 of the microprocessors 20-1 and 20-2 with the constant 13 by the computing unit 12, and comparing the result of computation with the other one of the outputs 21-1 and 21-2 by the comparator 11. The modification is suitable for the reason that the microprocessors 20-1 and 20-2 give each other questions for obtaining a variable which becomes a given value when a predetermined operation is performed on a constant, and assure a normal state when the-result is correct.

Figure 9:
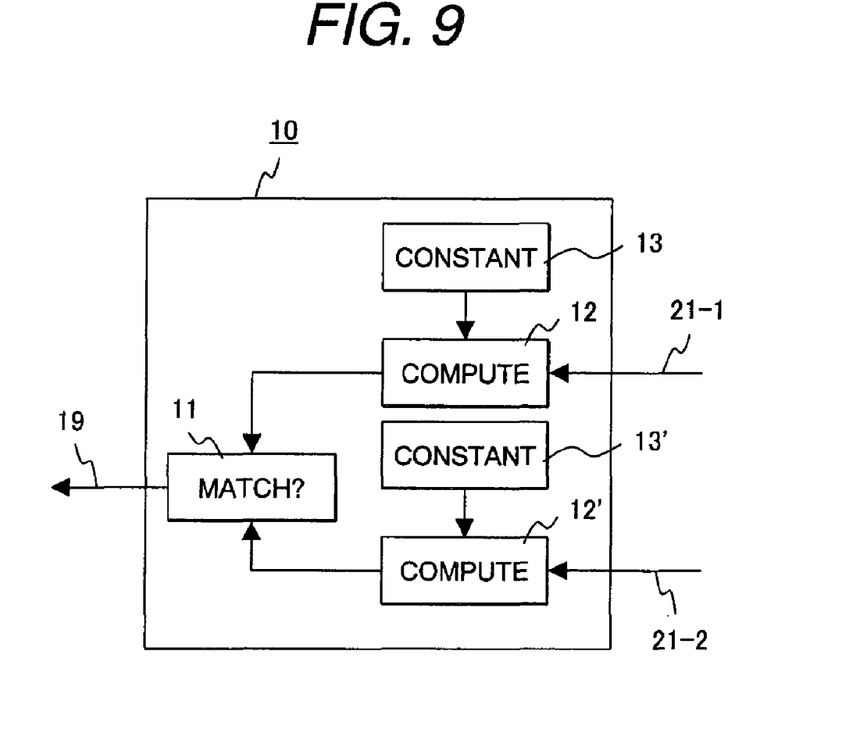
FIG. 9 is a block diagram showing a fourth pattern of the comparator measure.

FIG. 9 shows a fourth pattern of executing computation of the outputs 21-1 and 21-2 of the microprocessors 20-1 and 20-2 with constants 13 and 13' by computing units 12 and 12', and comparing the results by the comparator 11. The modification is suitable for the reason that the microprocessors 20-1 and 20-2 give each other questions for obtaining a variable which becomes a value derived by performing a predetermined operation on a given value and a constant and a predetermined computation, and assure a normal state when the result is correct. The modification is also effective to the case of performing a peculiar operation to identify each of outputs of the microprocessors 20-1 and 20-2 or performing an operation with a peculiar signature.

Sixth Embodiment

Figure 10:
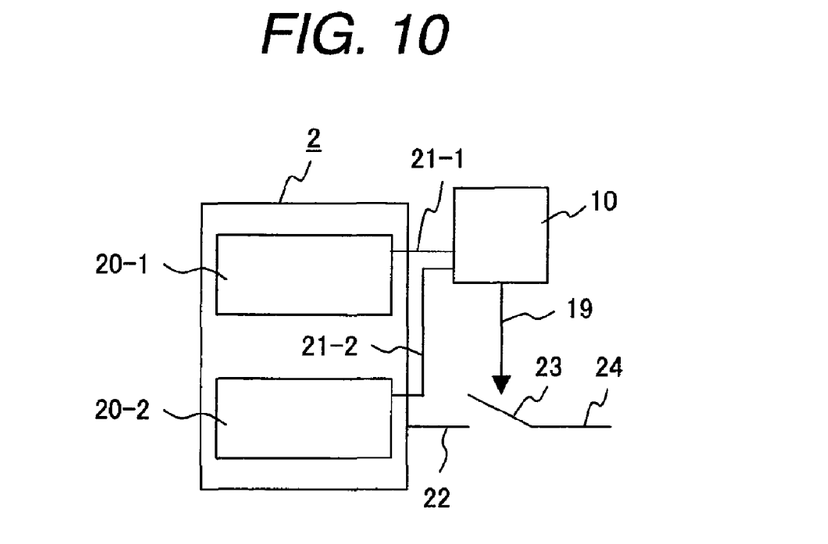
FIG. 10 is a block diagram showing a sixth embodiment related to application of a comparison result to a system output.

FIG. 10 shows a sixth embodiment related to application of the comparison result 19 of the comparator measure 10 obtained by comparing the outputs 21-1 and 21-2 of the microprocessors 20-1 and 20-2, to the control on the microprocessors. An output 22 from any of the microprocessors 20-1 and 20-2 included in the semiconductor chip 2 passes through a switch 23 as interrupting means which is controlled on the basis of the comparison result 19, and becomes an output 24. When the comparison result 19 indicates a normal state, the switch 23 is closed, and the output 22 becomes the output 24. When the comparison result 19 indicates a failure state, the switch 23 is opened, and the output 24 stops. In the embodiment, when a failure occurs in the microprocessors 20-1 and 20-2, the output 24 is stopped, and the system and an object to be controlled can be maintained in a safe state.

Seventh Embodiment

Figure 11:
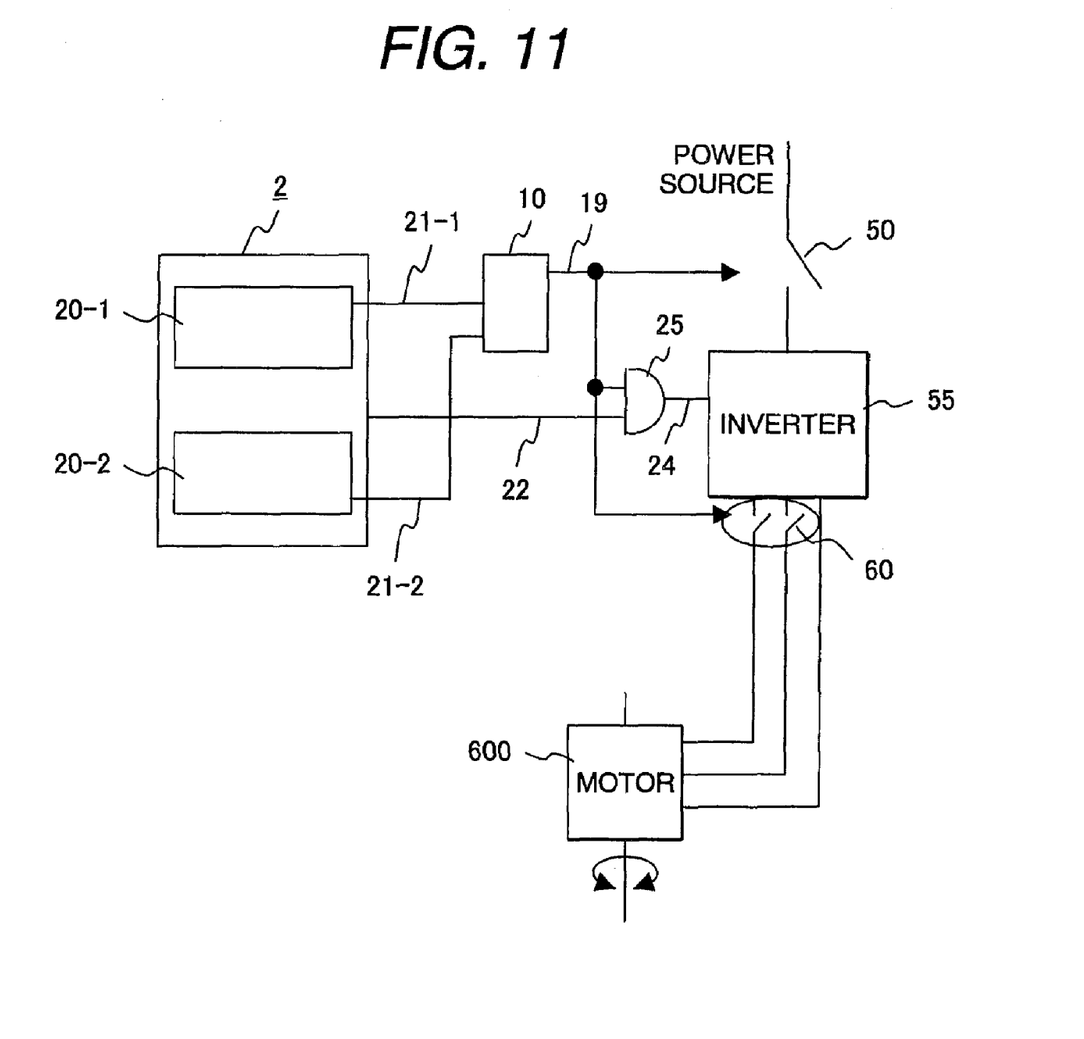
FIG. 11 is a block diagram showing a seventh embodiment related to application of a comparison result to a system output.

FIG. 11 shows a seventh embodiment of controlling a motor 600 by an inverter 55. In the seventh embodiment, a logic gate 25 is controlled by the comparison result 19 of the comparator measure 10 to intermittently supply a drive signal to the inverter 55 as an actuator. On the basis of the comparison result 19, the power is intermittently supplied to the inverter 55 by a relay 50, or drive current is intermittently supplied from the inverter 55 to the motor 600 by a relay 60. In the seventh embodiment, in the case where a failure occurs in the microprocessors 204 and 20-2, the motor 600 is stopped by some safety mechanisms, and the system and an object to be controlled can be maintained in a safe state more reliably.

Eighth Embodiment

Figure 12:
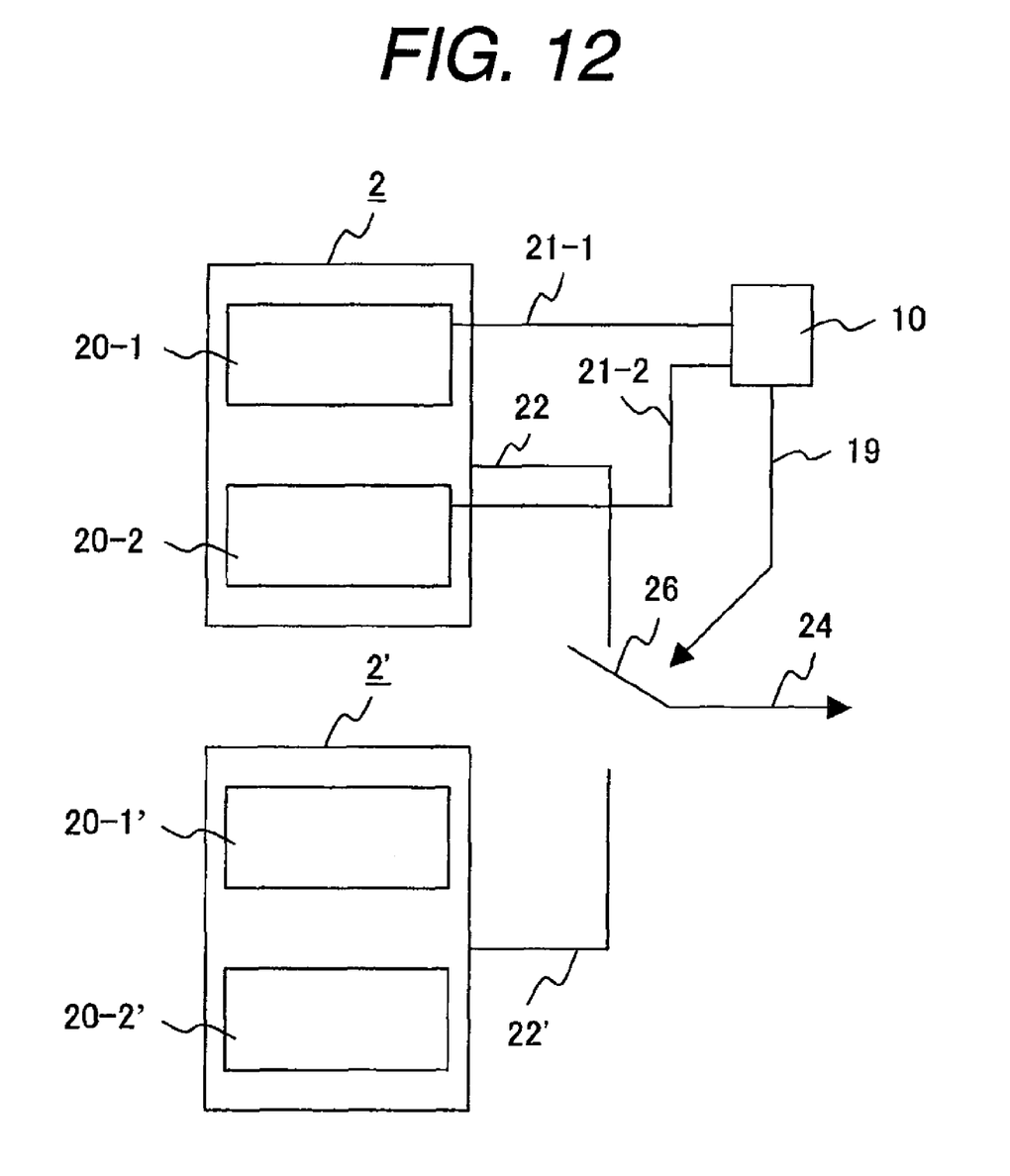
FIG. 12 is a block diagram showing an eighth embodiment related to application of a comparison result to a system output.

FIG. 12 shows an eighth embodiment of a redundant circuit having a double-chip configuration. An output 22 from any of the microprocessors 20-1 and 20-2 included in the semiconductor chip 2 and an output 22' of microprocessors 20-1' and 20-2' included in another semiconductor chip 2' are switched by a switch 26 as selecting means which is controlled on the basis of the comparison result 19 of the comparator measure 10, and the selected output is set as the output 24.

In the eighth embodiment, in the case where a failure occurs in the microprocessors 20-1 and 20-2, the operation of the system and an object to be controlled can be maintained using the output 22' of the microprocessors 20-1' and 20-2'.

Ninth Embodiment

Figure 13:
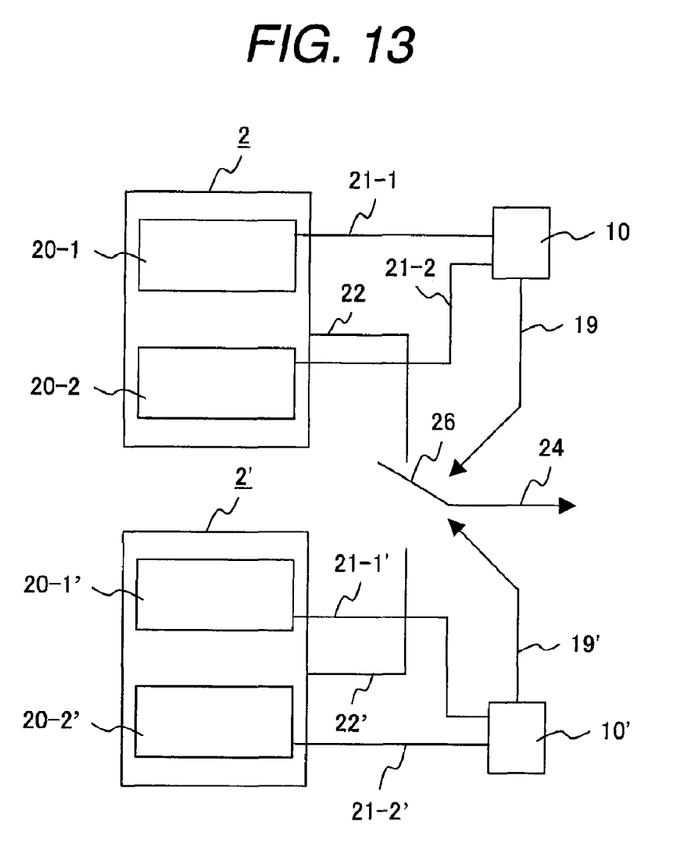
FIG. 13 is a block diagram showing a ninth embodiment related to application of a comparison result to a system output.

As shown in a ninth embodiment of FIG. 13, the switch 26 can be controlled by using not only the comparison result 19 but also a comparison result 19' obtained by comparing outputs 21-1' and 21-2' of the microprocessors 20-1' and 20-2' by a comparator measure 10'.

Tenth Embodiment

Figure 14:
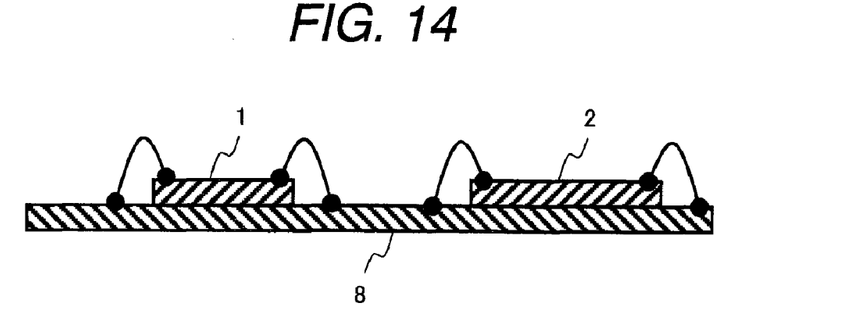
FIG. 14 is a block diagram showing a tenth embodiment in which bare chips are mounted on a wiring substrate.

FIG. 14 shows a tenth embodiment of mounting, as bare chips, a semiconductor chip 1 including a comparator measure and a semiconductor chip 2 including a redundant microprocessor on a wiring substrate 8. In the tenth embodiment, both prevention of spread of a failure between the semiconductor chip 1 and the semiconductor chip 2 including the redundant microprocessor, and reduction in size and weight can be realized. Since the semiconductor chips 1 and 2 are bare chips, they are protected by interrupting air by not-shown hermetic sealing, transfer mold, gel filling, or the like so that they do not come into contact with air and are not oxidized or do not absorb moisture, and their characteristics do not deteriorate.

Eleventh Embodiment

Figure 15:
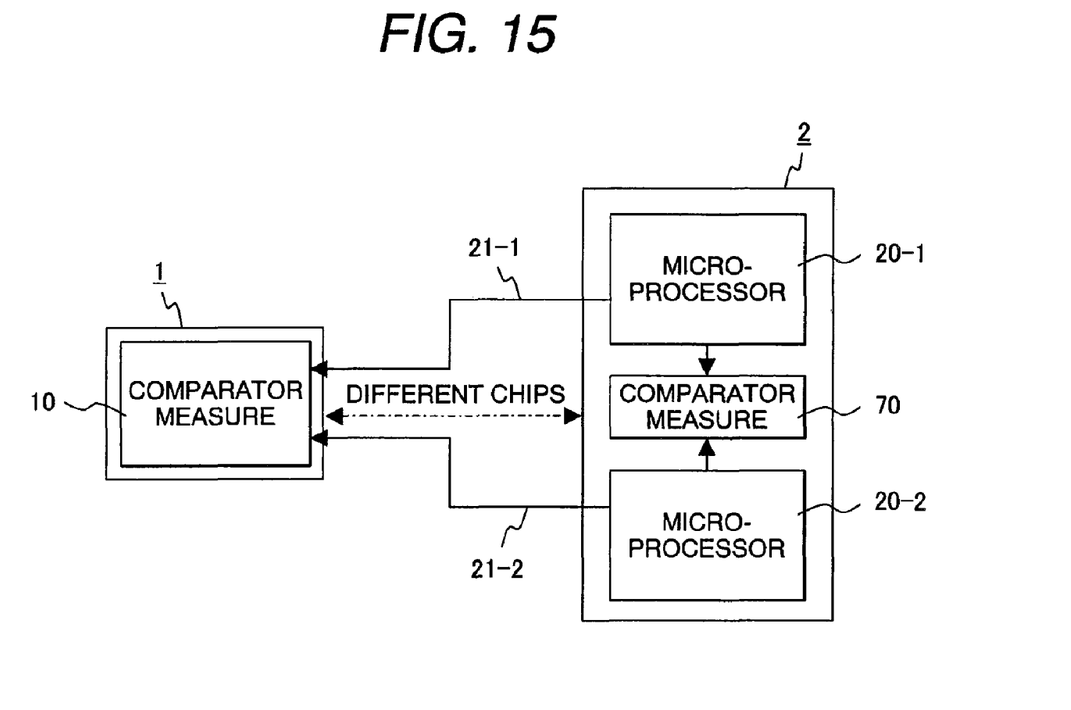
FIG. 15 is a block diagram showing an eleventh embodiment of the invention in which a comparator measure is provided for a semiconductor chip having a redundancy system.

FIG. 15 shows an eleventh embodiment of providing the comparator measure 10 in the semiconductor chip 1 and further providing a second comparator 70 for the semiconductor chip 2. In the embodiment, as a local failure in the chip, detection of a failure following high-speed operation of the microprocessor can be realized by the second comparator measure 70. Further, a unique effect of the present invention that the influence spreading to the whole can be prevented by the comparator measure 10 provided for the semiconductor chip 1 is obtained.

The following describes the other embodiments available to the invention.

(Supplementary Note 1)

A method of controlling an on-chip redundancy highly-reliable system comprising:

at least two function blocks having the same function and redundantly provided in a first semiconductor chip;

a comparator measure for comparing outputs of the function blocks in a second semiconductor chip;

at least two function blocks having the same function as that of the function blocks of the first semiconductor chip and redundantly provided in a third semiconductor chip;

a comparator measure for comparing outputs of the function blocks in the third semiconductor chip and provided in a fourth semiconductor chip; and selecting means for selecting, as an output of the system, either a first output from the function blocks in the first semiconductor chip or a second output from the function blocks in the third semiconductor chip, wherein either an output of the first semiconductor chip or an output of the third semiconductor chip which matches an output of the function blocks is selected by the selecting means and is output.

(Supplementary Note 2)

The on-chip redundancy highly-reliable system according to any of claims 1 to 5, wherein the first and second semiconductor chips are mounted on a wiring substrate, and the first and second chips and the wiring substrate are sealed in a package.
(Supplementary Note 3)
The on-chip redundancy highly-reliable system according to any of claims 1 to 5, further comprising a second comparator measure for comparing outputs of the plurality of function blocks and provided in the first semiconductor chip.

What is claimed is:

1. An on-chip redundancy highly-reliable system comprising:
    a first semiconductor chip;
    a second semiconductor chip;
    at least first and second function blocks, both of which have the same function and are provided redundantly in said first semiconductor chip;
    a first comparator measure, which is configured to detect errors in signals present at outputs of said first and second function blocks by comparing said outputs of said function blocks, and is provided in said second semiconductor chip; and
    a second comparator measure, which is configured to detect errors in signals present at outputs of said first and second function blocks by comparing outputs of said function blocks and is provided in said first semiconductor chip.

2. The on-chip redundancy highly-reliable system according to claim 1, wherein the function blocks are microprocessors.

3. The on-chip redundancy highly-reliable system according to claim 1, wherein the second semiconductor chip comprises at least one peripheral circuit that forms a part of the system.

4. The on-chip redundancy highly-reliable system according to claim 1, wherein the function blocks are hard logic circuits.

5. The on-chip redundancy highly-reliable system according to claim 4, wherein the second semiconductor chip comprises at least one peripheral circuit that forms a part of the system.

6. The on-chip redundancy highly-reliable system according to claim 2, wherein the second semiconductor chip includes a power source circuit for supplying power from a battery to the microprocessors.

7. The on-chip redundancy highly-reliable system according to claim 2, wherein the second semiconductor chip includes an output control that outputs a reset signal or a non-maskable interrupt signal to the microprocessors.

8. The on-chip redundancy highly-reliable system according to claim 7, wherein:
    at least one of said first and second comparator measure includes an output control circuit; and
    when outputs of the microprocessors do not match, said at least one of said first and second comparator measures outputs a reset signal or a non-maskable interrupt signal to the microprocessors.

9. The on-chip redundancy highly-reliable system according to claim 7, wherein:
    the second semiconductor chip includes a watch dog timer unit as an output control circuit; and
    in the case where signals do not arrive from the microprocessors in specified cycles, the watch dog timer unit outputs a reset signal or a non-maskable interrupt signal to the microprocessors.

10. The on-chip redundancy highly-reliable system according to claim 2, wherein the second semiconductor chip includes a driver circuit for driving a power semiconductor element based on output signals of the microprocessors.

11. The on-chip redundancy highly-reliable system according to claim 10, wherein the comparator measures are configured to stop operation of the driver circuit whenever outputs of the function blocks do not match.

12. The on-chip redundancy highly-reliable system according to claim 11, further comprising a booster circuit for supplying a voltage higher than a power source voltage applied to the driver circuit to the driver circuit; wherein, at least one comparator measure of said system is configured to stop operation of the booster circuit when outputs of the function blocks do not match.

13. The on-chip redundancy highly-reliable system according to claim 12, wherein an output of at least one of said first and second comparator measures is formed as an alternating signal.

14. The on-chip redundancy highly-reliable system according to claim 2, wherein the second semiconductor chip is provided with a power semiconductor element for driving an actuator based on a signal from the microprocessors.

15. The on-chip redundancy highly-reliable system according to claim 14, wherein at least one of said comparator measures is configured to stop operation of the power semiconductor element when outputs of the function blocks do not match.

16. The on-chip redundancy highly-reliable system according to claim 2, further comprising interrupting means for interrupting an output signal from the microprocessors, wherein at least one comparator measure of said system is configured to stop outputs from the microprocessors by the interrupting means when outputs of the microprocessors do not match.

17. The on-chip redundancy highly-reliable system according to claim 1, further comprising interrupting means for interrupting an output from the function blocks; wherein at least one comparator measure of said system is configured to interrupt outputs from an output circuit to an actuator when outputs of the function blocks do not match.

18. The on-chip redundancy highly-reliable system according to claim 1, further comprising interrupting means for interrupting power supply to an output circuit; wherein at least one comparator measure of said system is configured to stop power supply to an output circuit when outputs of the function blocks do not match.

19. The on-chip redundancy highly-reliable system according to claim 1, further comprising
    third and fourth function blocks, both of which have the same function as the first and second function blocks, and which are redundantly provided in a third semiconductor chip; and
    selecting means for selecting an output of the third semiconductor chip as an output of the system when outputs of the function blocks in the first semiconductor chip do not match.

20. The on-chip redundancy highly-reliable system according to claim 1, further comprising:
    at least third and fourth function blocks, both of which have the same function as the first and second function blocks, and which are redundantly provided in a third semiconductor chip;
    a comparator measure provided in a fourth semiconductor chip, for comparing outputs of the third and fourth function blocks; and selecting means for selecting, as an output of the system, either a first output from the first and second function blocks or a second output from the third and fourth function blocks.

21. An electronic system comprising:
a first semiconductor chip having at least first and second function blocks formed therein, said first and second function blocks being configured to perform the same function, redundantly;
a second semiconductor chip;
first and second comparator circuits, each of which is configured to detect errors in signals present at outputs of said first and second function blocks, by comparing said outputs of said function blocks;
wherein said first comparator circuit is formed in said first semiconductor chip, and said second comparator circuit is formed in said second semiconductor chip.

22. The electronic system according to claim 21, wherein said second semiconductor chip has formed therein at least one peripheral circuit for operating the first and second function blocks.

* * * * *